United States Patent
Anderson et al.

(10) Patent No.: US 12,485,987 B2
(45) Date of Patent: *Dec. 2, 2025

(54) ILLUMINATING BICYCLE WHEEL DEVICE

(71) Applicant: Brightz, Ltd., Ottawa Lake, MI (US)

(72) Inventors: Brent Anderson, Ottawa Lake, MI (US); Brian Finch, Ottawa Lake, MI (US)

(73) Assignee: Brightz, Ltd., Ottawa Lake, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/925,013

(22) Filed: Oct. 23, 2024

(65) Prior Publication Data

US 2025/0050959 A1 Feb. 13, 2025

Related U.S. Application Data

(63) Continuation of application No. 17/846,443, filed on Jun. 22, 2022, now Pat. No. 12,151,765, which is a
(Continued)

(51) Int. Cl.
| | |
|---|---|
| *B62J 6/20* | (2006.01) |
| *B62J 43/20* | (2020.01) |
| *B62J 43/30* | (2020.01) |
| *F21S 9/02* | (2006.01) |
| *F21V 21/08* | (2006.01) |
| *F21V 21/088* | (2006.01) |
| *F21V 23/04* | (2006.01) |

(Continued)

(52) U.S. Cl.
CPC .................. *B62J 6/20* (2013.01); *B62J 43/20* (2020.02); *B62J 43/30* (2020.02); *F21S 9/02* (2013.01); *F21V 21/0816* (2013.01); *F21V 21/088* (2013.01); *F21V 23/04* (2013.01); *F21V 21/0885* (2013.01); *F21W 2107/13* (2018.01); *F21Y 2113/10* (2016.08)

(58) Field of Classification Search
CPC .... B62J 6/20; B62J 43/20; B62J 43/30; F21S 9/02; F21V 21/0816; F21V 21/088; F21V 23/04; F21V 21/0885; F21Y 2113/10; F21W 2107/13
USPC .......................................................... 362/473
See application file for complete search history.

(56) References Cited

U.S. PATENT DOCUMENTS

| | | |
|---|---|---|
| 5,584,562 A | 12/1996 | Geran |
| 5,984,487 A | 11/1999 | McGhee |

(Continued)

*Primary Examiner* — Laura K Tso
(74) *Attorney, Agent, or Firm* — Vorys, Sater, Seymour and Pease LLP; Rex W. Miller, II

(57) ABSTRACT

Disclosed is an illumination device for use with spoked wheels, such as bicycle wheels, wherein the wheel includes a hub portion, a plurality of spokes, and a rim portion. The illumination device includes a power pack, at least one adaptor body, and at least one attachment portion. The power pack having at least one wire, a flexible button cap, a body housing, and circuit board with a switch. The at least one wire including a plurality of light sources. The at least one attachment portion including a clip portion providing for the installation of the at least one adaptor body to the bicycle spokes. The illumination device also includes a holder for the installation of the power pack to the bicycle wheel. Further, the illumination device may include a tubular body located in the internal cavity of the at least one adaptor body.

28 Claims, 15 Drawing Sheets

Related U.S. Application Data continuation of application No. 17/374,828, filed on Jul. 13, 2021, now Pat. No. 11,396,339.

(60) Provisional application No. 63/051,146, filed on Jul. 13, 2020.

(51) Int. Cl.
*F21W 107/13* (2018.01)
*F21Y 113/10* (2016.01)

(56) References Cited

U.S. PATENT DOCUMENTS

| | | | |
|---|---|---|---|
| 6,267,451 | B1 | 7/2001 | Chen |
| 6,492,963 | B1 * | 12/2002 | Hoch ........................ G09F 9/33 340/432 |
| 6,822,357 | B2 | 11/2004 | Hung |
| 10,351,194 | B1 | 7/2019 | Finch |
| 11,396,339 | B2 | 7/2022 | Anderson et al. |
| 12,151,765 | B2 * | 11/2024 | Anderson ................ B62J 43/30 |
| 2002/0136021 | A1 | 9/2002 | Hung |
| 2005/0110332 | A1 * | 5/2005 | Peng ........................ B60B 1/003 301/37.108 |
| 2006/0092647 | A1 * | 5/2006 | Glasser ...................... B62J 6/20 362/208 |
| 2006/0273653 | A1 | 12/2006 | Lewis |
| 2009/0116230 | A1 | 5/2009 | Young |
| 2012/0200401 | A1 | 8/2012 | Goldwater |
| 2012/0320614 | A1 | 12/2012 | Malone |
| 2014/0355283 | A1 | 12/2014 | Kurumatani |
| 2016/0003447 | A1 | 1/2016 | McRae |
| 2021/0319962 | A1 | 10/2021 | Chu |

* cited by examiner

ILLUMINATING BICYCLE WHEEL DEVICE

CROSS-REFERENCE TO RELATED APPLICATIONS

This application is a continuation of and claims priority to and the benefit of U.S. patent application Ser. No. 17/846,443 filed Jun. 22, 2022, which claims priority to U.S. patent application Ser. No. 17/374,828, filed on Jul. 13, 2021, which has issued as U.S. Pat. No. 11,396,339 on Jul. 26, 2022, which claims priority to and the benefit of provisional U.S. Patent Application No. 63/051,146, filed on Jul. 13, 2020, all incorporated herein in their entireties.

BACKGROUND

Bicycle wheels with integrally formed illumination sources are known in the art.

However, said wheels require replacing pre-existing wheels, or purchasing a bicycle with illuminated wheels already in place. These products increase costs to the consumer significantly, especially a consumer who already owns a bicycle or vehicle with similarly styled wheels.

Many of the already existing apparatuses for illuminating a bicycle wheel are large and cumbersome as said apparatuses include non-flexible parts and large power sources. The majority of these apparatuses include power sources requiring the use of regular sized batteries, for example, AA or AAA batteries. The weight of said apparatuses can significantly offset the center of the mass of the bicycle wheel, introducing centripetal forces onto the device. Therefore, in order to brace against these forces, said devices require the mass of the device to be increased, further offsetting the center of mass of the bicycle wheel.

Thus, there is a need in the art for a device which can illuminate a bicycle tire without the drawbacks of the prior art.

SUMMARY

Presently disclosed is an illumination device for bicycle wheels, where the illumination device comprises a power pack, at least one adaptor body, and at least one attachment portion. The power pack including at least one wire, wherein said wire comprises a plurality of light sources. The plurality of light sources are placed inside the adaptor body and the adaptor body is attached to the bicycle wheel using the at least one attachment portion. The power pack is attached to the bicycle wheel by a holder. The holder may attach the power pack to a hub portion of the bicycle wheel. Alternatively, the holder may attach the power pack to a plurality of spokes of the bicycle wheel. In some embodiments, the illumination device may further include at least one tubular body inside the at least one adaptor body. The at least one tubular body providing for the diffusion of light of the plurality of light sources inside the at least one adaptor body.

DETAILED DESCRIPTION OF THE FIGURES

Figure 1:
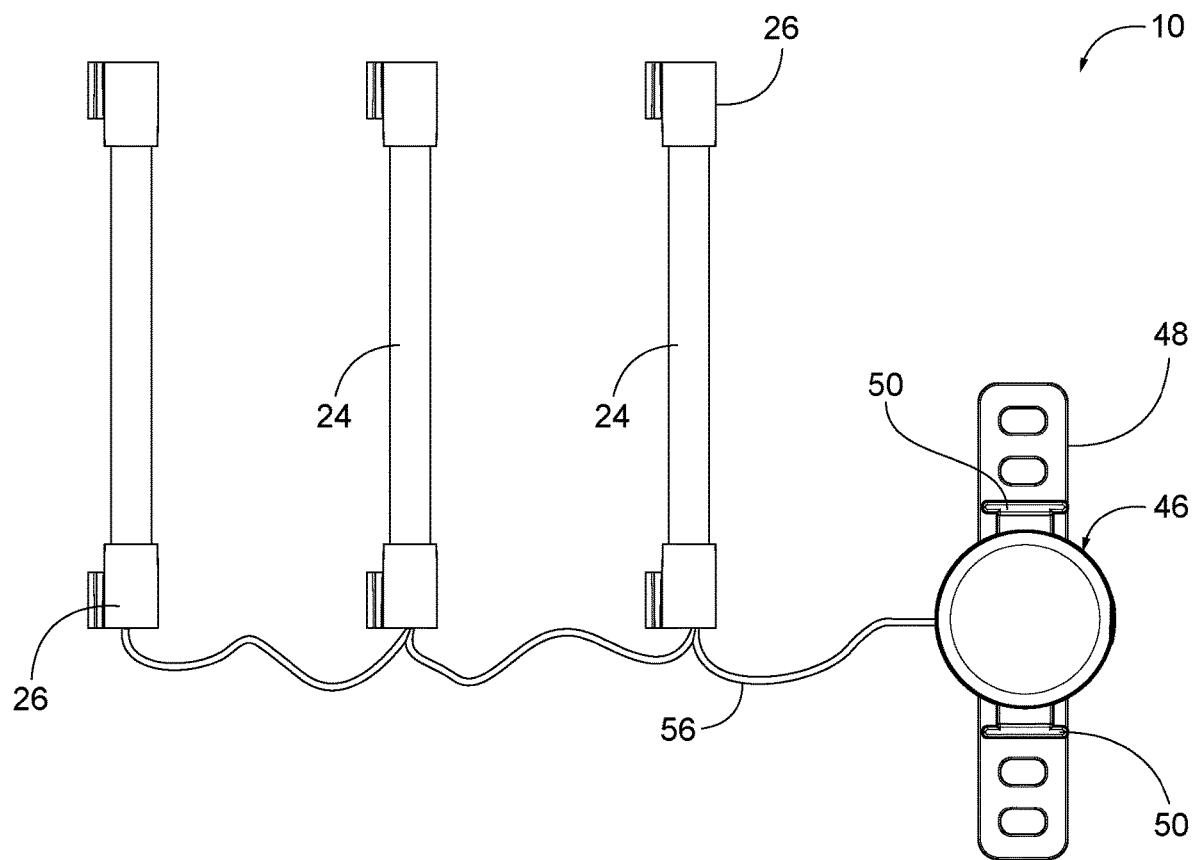
FIG. 1 illustrates a top view of an illumination device for a bicycle wheel.

FIGS. 1-14F illustrate the currently claimed illumination device 10 for a bicycle wheel 12. A bicycle wheel 12 comprises a tire portion 14, a hub portion 16, a μm portion 18, and a plurality of spokes 20. The rim portion 18 provides structure to the tire portion 14 of the bicycle wheel 12. The hub portion 16 is located in the center of the wheel. Each spoke of the plurality of spokes 20 comprises two ends. One end of the spoke connects to the hub portion and the other end of the spoke connects to rim portion. As discussed and described in detail below, the illumination device 10 may be installed on various locations of the bicycle wheel.

Figure 2:
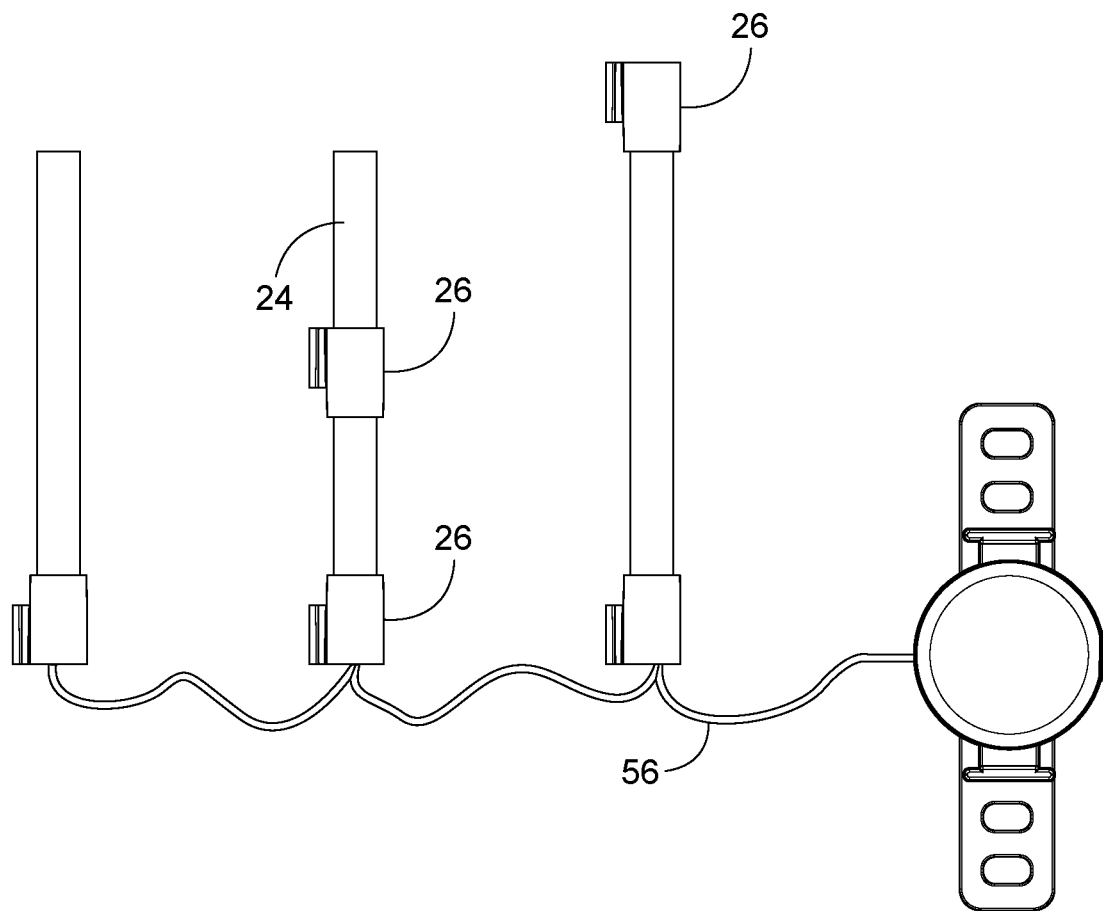
FIG. 2 illustrates a top view of an illumination device for a bicycle wheel.
Figure 3:
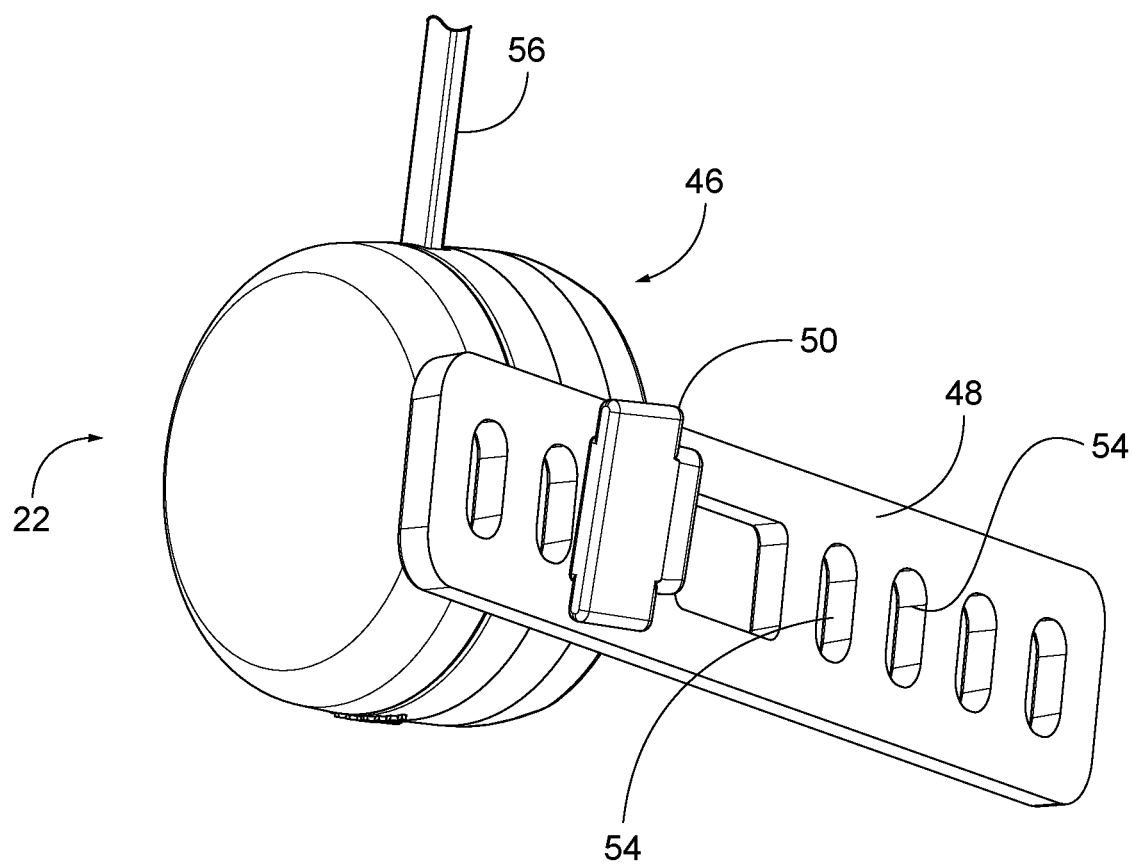
FIG. 3 illustrates a close-up view of a portion of an illumination device for a bicycle wheel.

FIGS. 1-2 show the illumination device 10 comprising a power pack 22, at least one adaptor body 24, and at least one attachment portion 26. Each adaptor body 24 includes a proximal end 28, a distal end 30, and an internal cavity 32. The internal cavity 32 of each adaptor body 24 extends from the proximal end 28 to the distal end 30. The adaptor body may comprise of a semi-opaque material. Alternatively, or additionally, the adaptor body may comprise of a clear material. In either case, the adaptor body material allows light to shine from the inside cavity to the outside of the adaptor body.

Figure 6:
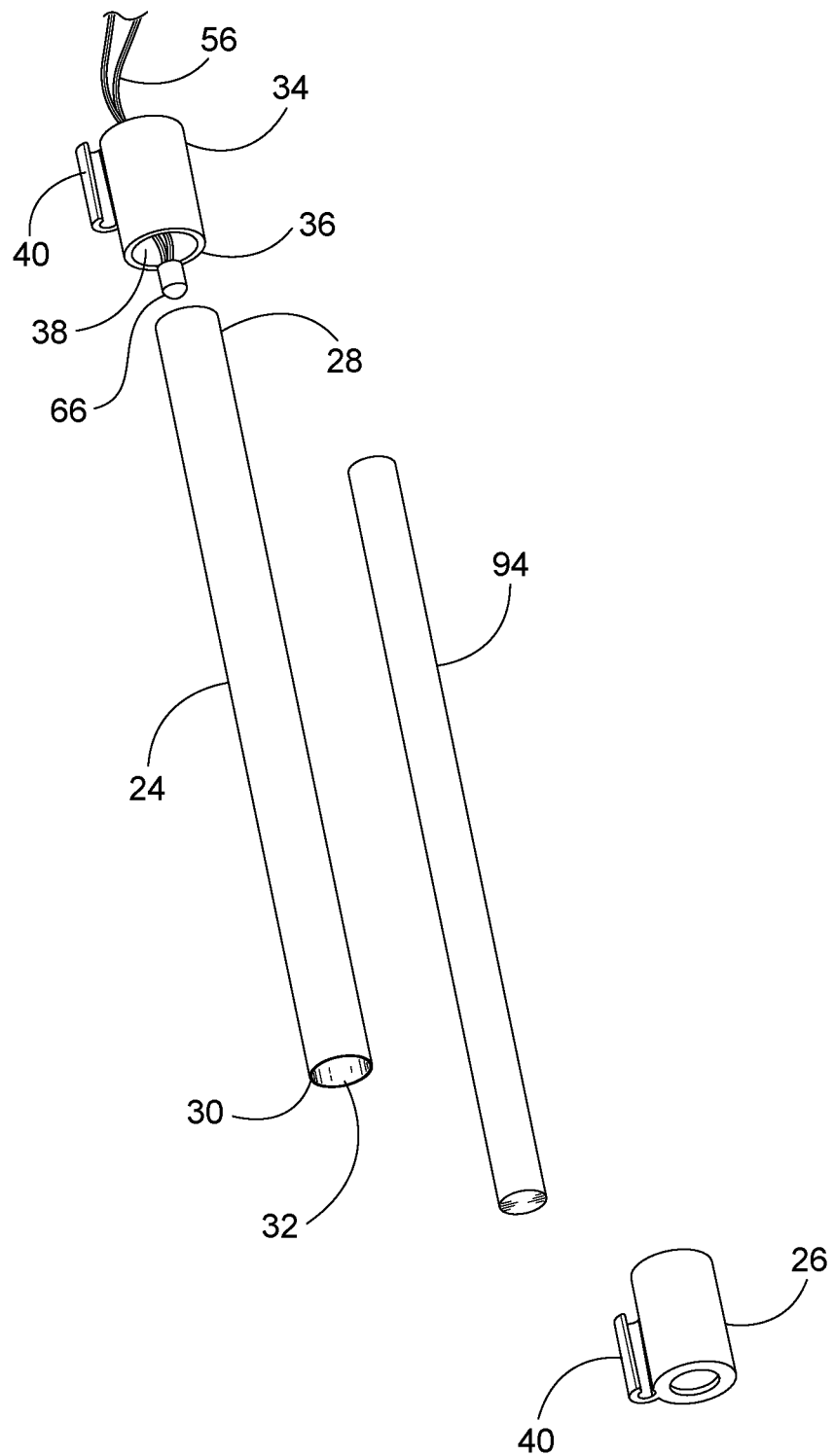
FIG. 6 illustrates an exploded view of a portion of an illumination device for a bicycle wheel.

As show in FIG. 6, each attachment portion 26 comprises a first end 34, a second end 36, an internal cavity 38, and a clip portion 40. The internal cavity 38 of each attachment portion is adapted to receive an adaptor body 24. The at least one attachment portion may be removably attached to the adaptor body. Alternatively, or additionally, the at least one attachment portion may be fixed to the adaptor body. As shown in FIG. 2, the at least one attachment portion 26 may be placed at the proximal end 28 of the adaptor body, at the distal end 30 of the adaptor body, or both. Additionally, or alternatively, the at least one attachment portion may be placed between the proximal end 28 and distal end 30 of the adaptor body.

Figure 11:
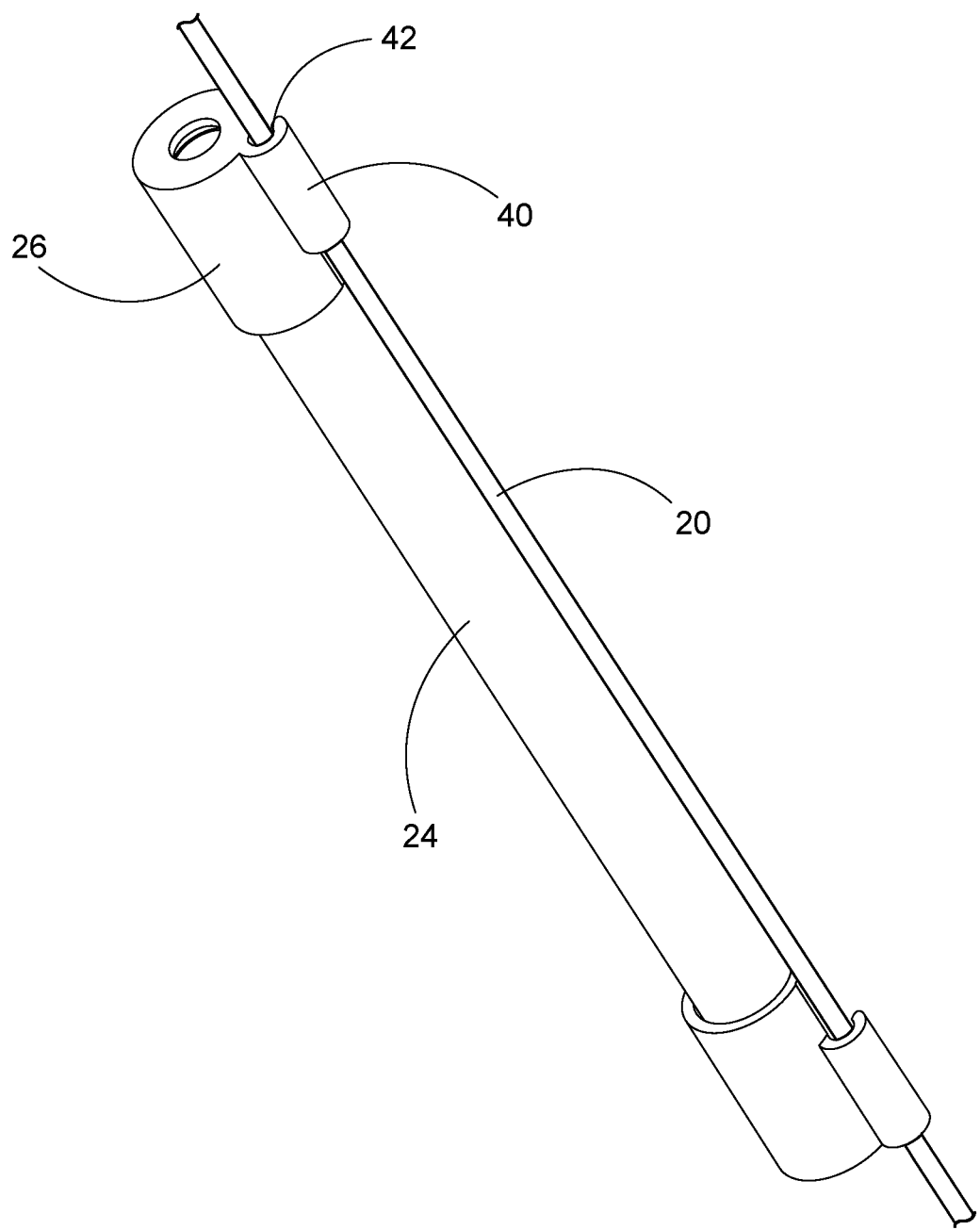
FIG. 11 illustrates a portion of an illumination device for a bicycle wheel installed on a spoke of a bicycle wheel.

The clip portion 40 of each attachment portion 26 provides a surface for installation of the corresponding adaptor body 24 to the bicycle wheel. As shown in FIG. 11, the clip portion 40 comprises a semicircular shape portion 42. The semicircular shape portion 42 attaches to a spoke 44 of the plurality of spokes 20 of the bicycle wheel locking the clip portion 40 to the spoke 44. In turn, the attachment portion 26 and corresponding adaptor body 24 are attached to the bicycle wheel 12. The semicircular shaped portion of the clip portion allows for the placement of the attachment portion and adaptor body throughout the length of the spoke.

As shown in FIGS. 1-5, a holder 46 may removably attach the power pack 22 to the bicycle wheel. The holder 46 comprises an adjustable strap portion 48, at least two hook portions 50, and a pocket portion 52, wherein the adjustable strap portion 48 is removably attached to at least one hook portion of the at least two hook portions 50. The power pack 22 may be located within the pocket portion 52 of the holder 46. The adjustable strap portion 48 may comprise a plurality of openings 54 adapted to adjust the length of the adjustable strap for installation to the bicycle wheel, each opening 54 capable of accepting one hook portion of the at least two hook portions 50.

Figure 4:
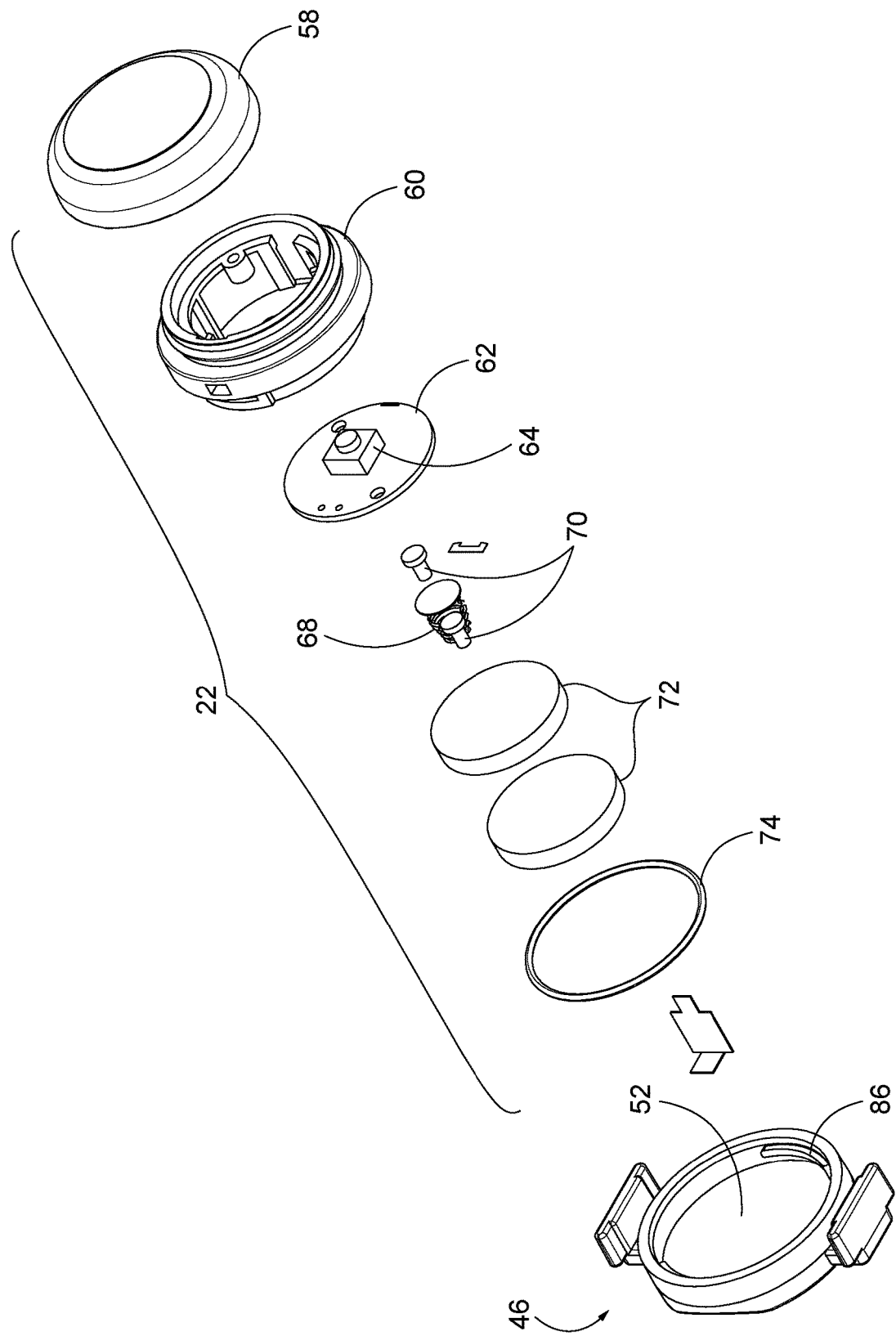
FIG. 4 illustrates a top exploded view of a power pack and holder of an illumination device for a bicycle wheel.
Figure 5:
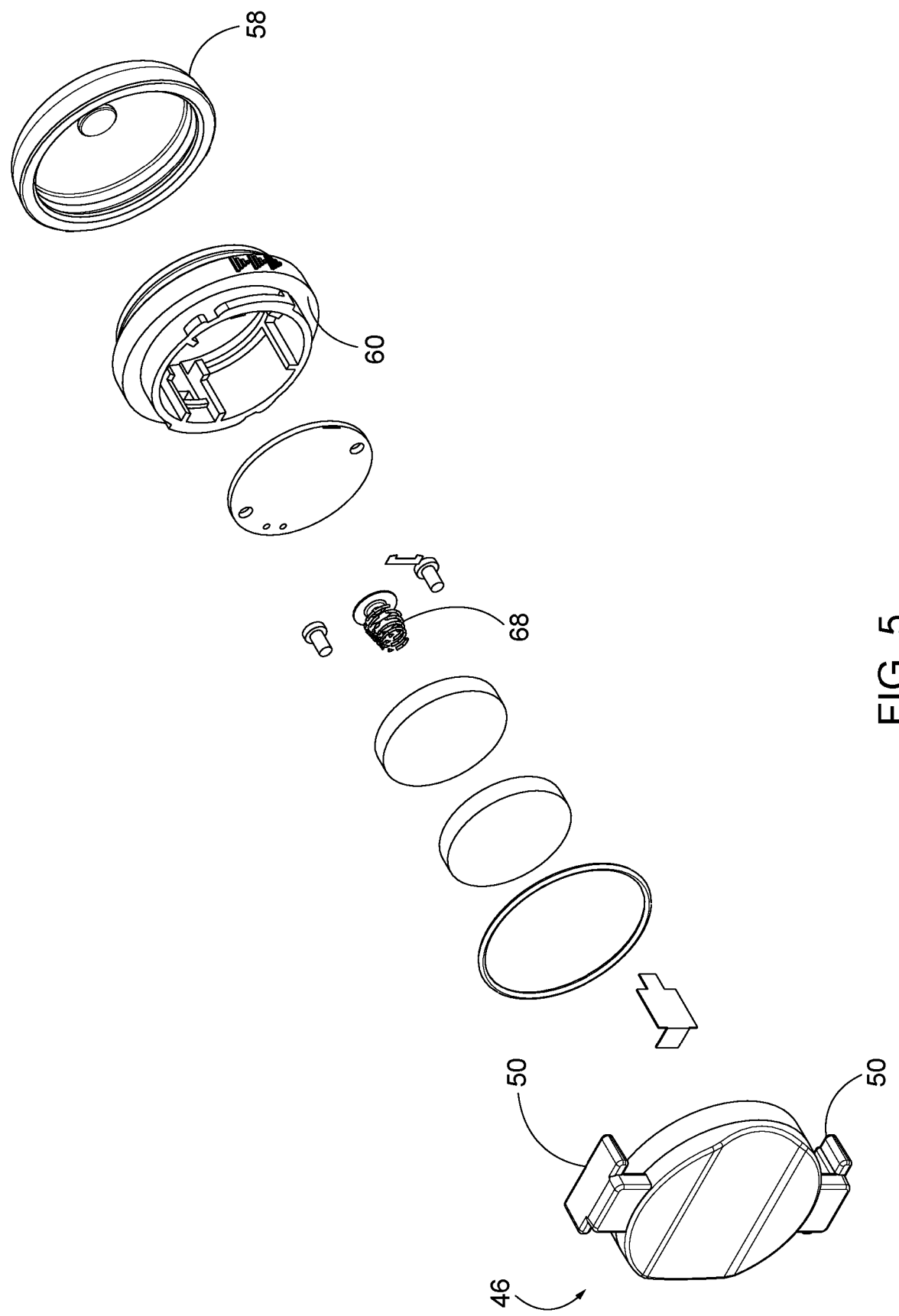
FIG. 5 illustrates a bottom exploded view of a power pack and holder of an illumination device for a bicycle wheel.

FIGS. 4-5 illustrate exploded top and bottom views of power pack 22 and holder 46, respectively. Power pack 22 comprises at least one wire 56, a flexible button cap 58, a body housing 60, and a circuit board 62 with a switch 64. The at least one wire 56 comprises a plurality of light sources 66, wherein the plurality of light sources may include Light Emitting Diodes (LEDs). The plurality of lights sources may also include LEDs emitting light at varying wavelengths. The wavelengths may change over time. In one aspect, wherein the power pack comprises two or more wires, each wire may include a plurality of light sources emitting light at different wavelengths.

The power pack 22 may further comprise a spring 68, a pair of fasteners 70, at least one battery 72, and an O-ring 74. The spring 68 provides for the electrical contact between the circuit board 62 and the at least one battery. The at least one battery may include CR2032 batteries. The O-ring 74 provides for a waterproof seal.

Figure 14A:
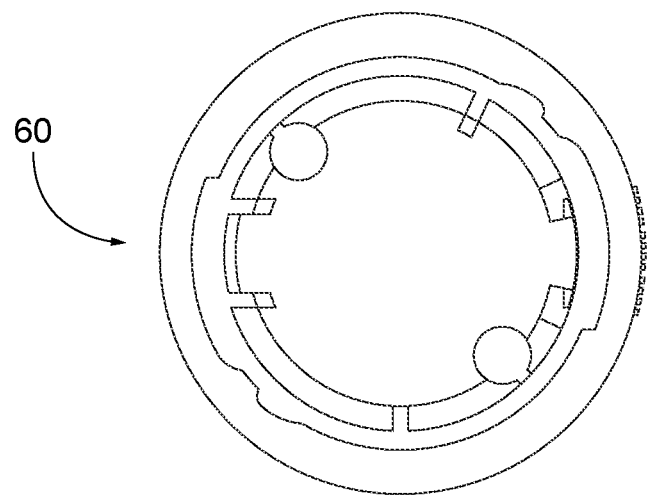
FIG. 14A illustrates a bottom view of a body housing portion of a power pack of an illumination device for a bicycle wheel.
Figure 14B:
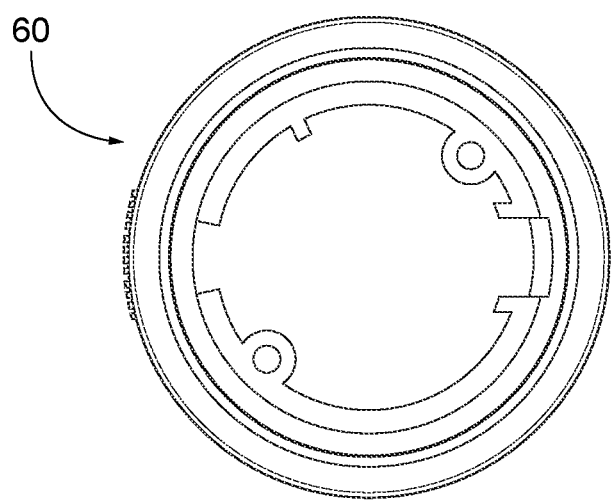
FIG. 14B illustrates a top view of a body housing portion of a power pack of an illumination device for a bicycle wheel.
Figure 14C:
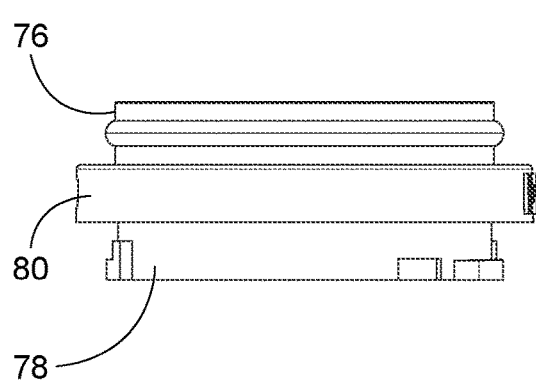
FIG. 14C illustrates a side view of a body housing portion of a power pack of an illumination device for a bicycle wheel.
Figure 14D:
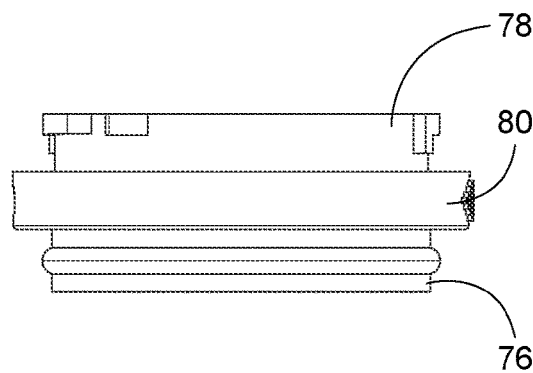
FIG. 14D illustrates a side view of a body housing portion of a power pack of an illumination device for a bicycle wheel.
Figure 14E:
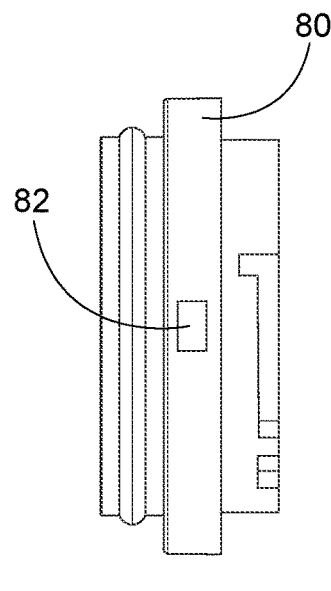
FIG. 14E illustrates a bottom view of a body housing portion of a power pack of an illumination device for a bicycle wheel.

FIGS. 14A-14F show close-up views of the body housing 60 of the power pack 22. FIG. 14A shows a bottom view of the body housing 46. FIG. 14B shows a top view of the body housing 46. The body housing 60 comprises of a top portion 76, a bottom portion 78, and a central portion 80. The top portion 76 of the body housing may be removably attached to the flexible body cap 58. Alternatively, the top portion of the body housing may be fixed to the flexible body cap. As shown in FIG. 14E, the central portion 80 comprises an opening 82 wherein the at least one wire 56 exits the power pack, said opening including waterproofing material.

Figure 14F:
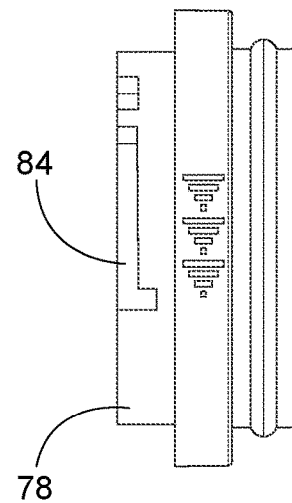
FIG. 14F illustrates a side view of a body housing portion of a power pack of an illumination device for a bicycle wheel.

The bottom portion 78 of the body housing may be removably attached to the holder 46. As illustrated in FIG. 14F, the bottom portion 78 of the body housing may comprise at least one bayonet attachment 84. The body housing rotates in one direction causing the bayonet attachment to slide into a matching shaped slot 86 in the holder 46, compressing the O-ring 74. The body housing may be threaded. Alternatively, or additionally, the body housing may be non-threaded. When the body housing is removed from the holder, the spring 68 pushes the at least one battery slightly upwards partially ejecting the battery or batteries from the body housing. The circuit board 62 keeps each battery in place. The battery or batteries rotate but remain mechanically connected to the body housing. This mechanism provides for easy access to each battery facilitating the replacement of the same.

The compact design of the power pack and holder allows for the installation of the power pack in multiple locations of a bicycle wheel. In one aspect of the invention, as illustrated in FIGS. 8-12, and more specifically in FIGS. 13A-13B, a power pack 88 may be installed on a hub portion 90 of a bicycle wheel. Alternatively, or additionally, the power pack 88 may be installed between spokes 92 of a bicycle wheel.

Figure 8:
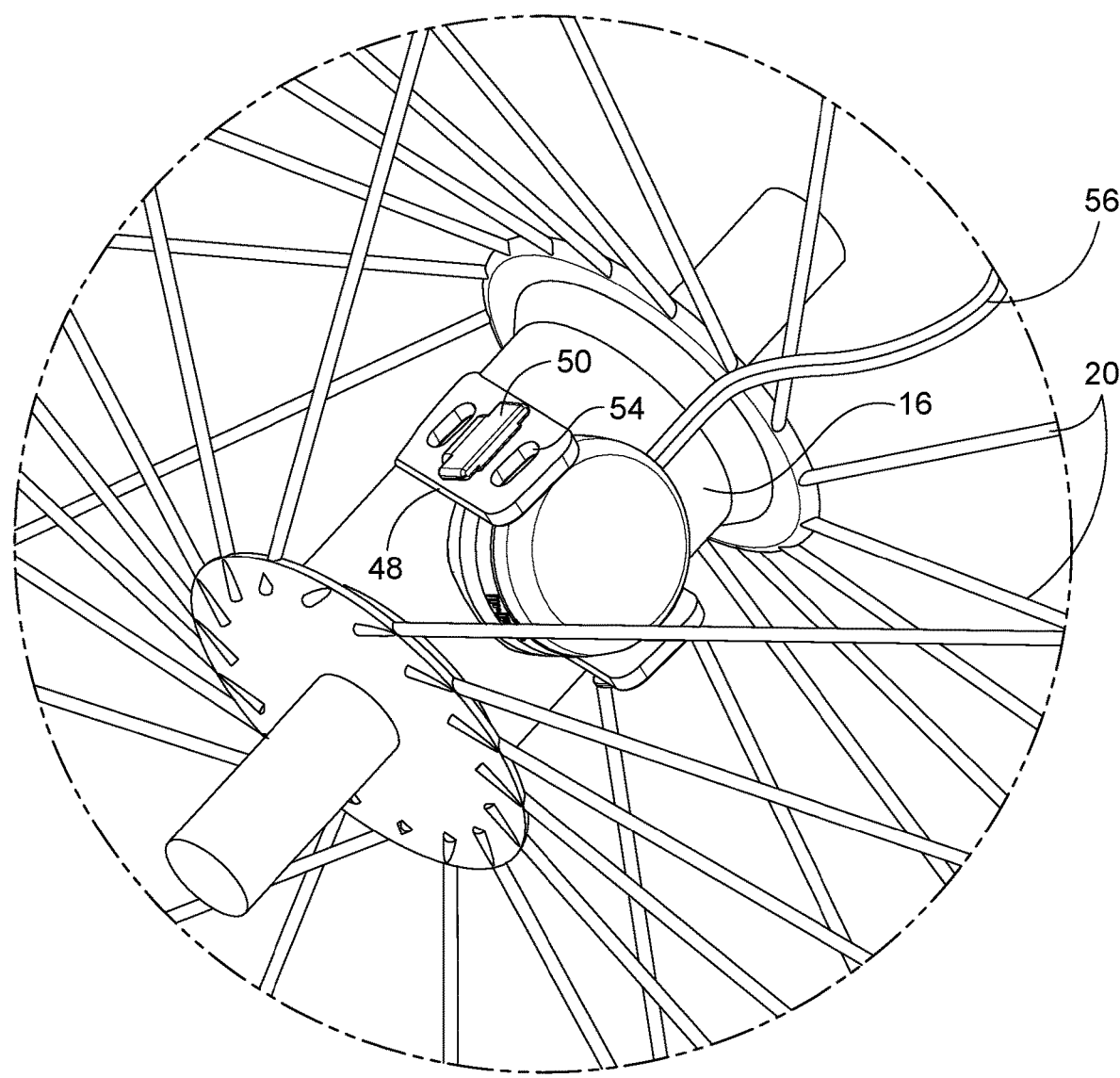
FIG. 8 illustrates an isometric view of a portion of an illumination device for a bicycle wheel installed on a hub portion of a bicycle wheel.
Figure 13A:
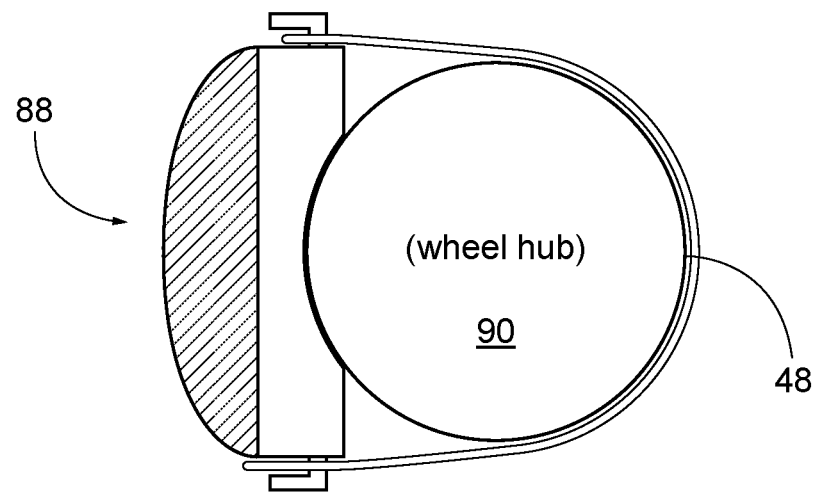
FIG. 13A illustrates a top view of a portion of an illumination device for a bicycle wheel installed on a hub portion of a bicycle wheel.
Figure 13B:
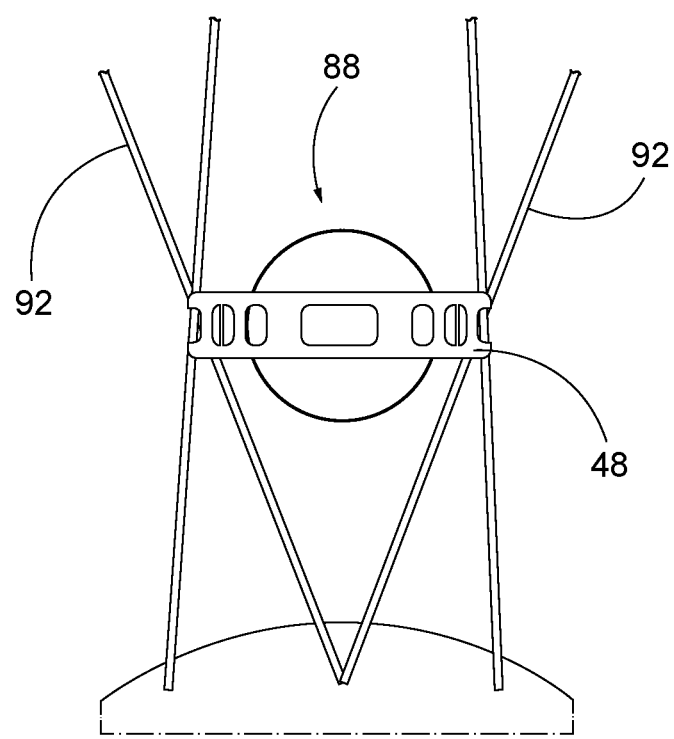
FIG. 13B illustrates a portion of an illumination device for a bicycle wheel installed on a plurality of spokes of a bicycle wheel.

The power pack is removably attached to the holder. As described above, the holder includes an adjustable strap portion, at least two hook portions, and a pocket portion. In some aspects, the adjustable strap portion may include a plurality of openings, each opening capable of accepting at least one hook portion. As shown in FIG. 8 and FIG. 13A, to install the power pack to the hub portion of the bicycle wheel, the adjustable strap 48 of the holder 46 is wrapped around the circumference of the hub portion of the bicycle tire. Then, the adjustable strap portion 48 is linked to the at least one hook portion of the ate least two hook portions 50 through at least one opening of the plurality of openings 54 of the adjustable strap. The power pack and holder, and hence the illumination device, may stay secured to the central hub portion of the bicycle wheel due to the material of the adjustable strap portion, wherein said material has a high coefficient of friction, for example, rubber like material. The material may also be elastic. The elasticity allows the adjustable strap portion to be stretched out beyond its resting length to link to the at least one hook portion. By stretching the adjustable strap portion, the device can exert normal pressure onto the central hub portion of the bicycle wheel; thus, increasing friction and securing the holder, power pack, and hence, the illumination device to the bicycle wheel. Furthermore, the elasticity of the adjustable strap portion allows for the same to be customizable to the circumference of the hub portion. As such, the illumination device can be used on a variety of hub portion sizes.

Figure 7:
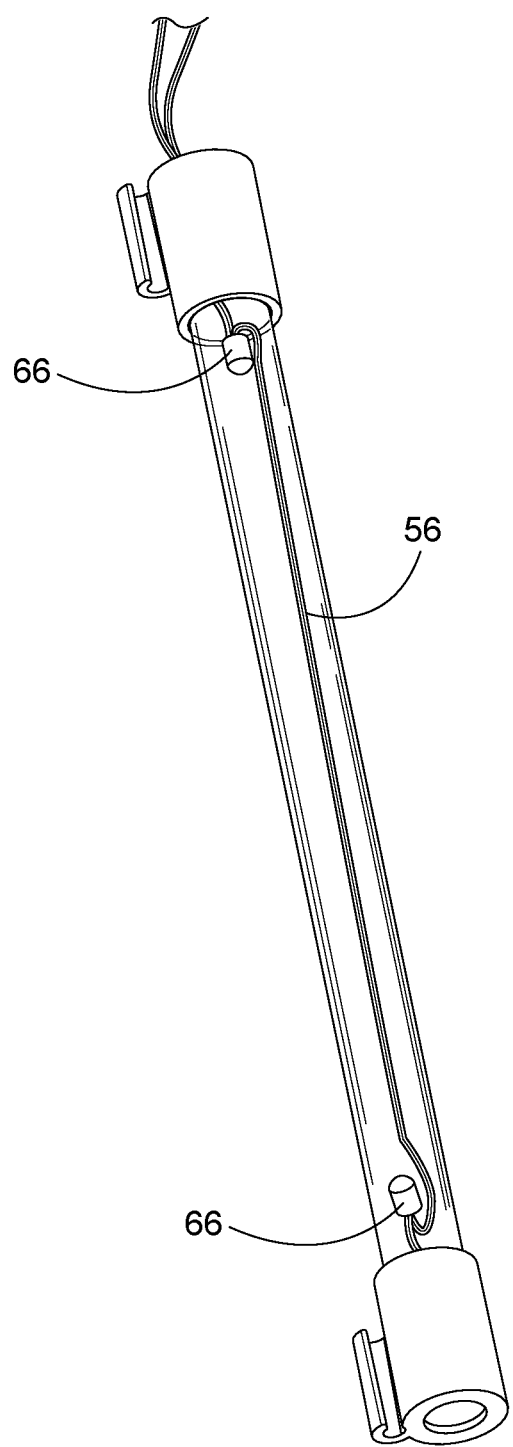
FIG. 7 illustrates a portion of an illumination device for a bicycle wheel.

In one aspect of the invention, the at least one wire comprising a plurality of light sources, may be extended throughout the length of the internal cavity of the adaptor body from the proximal end to the distal end of the adaptor body. As illustrated in FIG. 7, extending the at least one wire throughout the internal cavity of the adaptor body result in having more than one light source inside the adaptor body. The adaptor body may comprise of semi-opaque material. Alternatively, the adaptor body may comprise a clear material. When the illumination device is in used, the light of the plurality of light sources shine from the inside cavity of the adaptor body to the outside illuminating the device and in turn, the bicycle wheel. The color of the adaptor body material may match the color of the plurality of lights. Alternatively, or additionally, the plurality of light sources may output a different frequency of light for each wire of the at least one wire.

Figure 12:
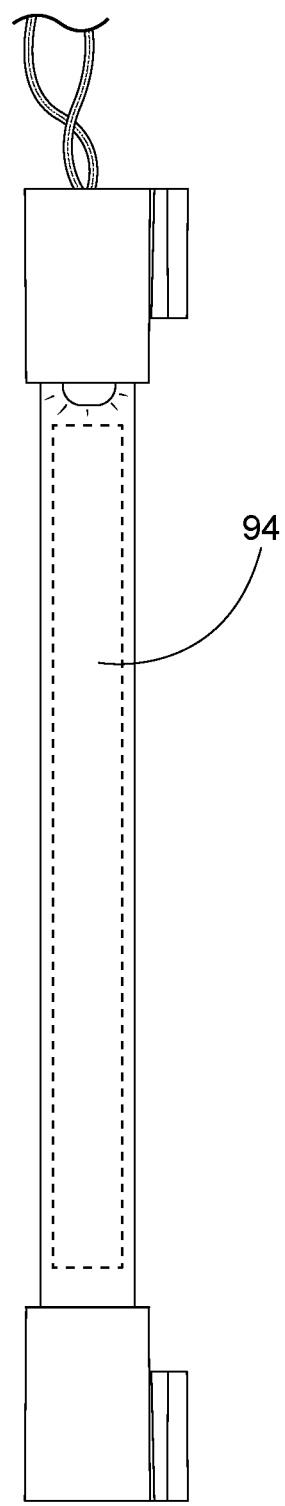
FIG. 12 illustrates a portion of an illumination device for a bicycle wheel.

In another aspect of the invention, as illustrated in FIG. 6, the illumination device may further include at least one tubular body 94. The at least one tubular body may be a solid tube. As shown in FIG. 12, the at least one tubular body 94 is placed in the internal cavity of an adaptor body 48 and extends from the proximal end 50 of the adaptor body to the distal end 52 of the adaptor body. At least one wire including a plurality of light sources is placed at the proximal end of the adaptor body. The tubular body is placed in the inside cavity of the adaptor body. The tubular body allows for the diffusion of light of the at least one light of the plurality of light sources located at the proximal end of the adaptor body. The tubular body allows for the diffusion of light throughout the length of the internal cavity of the adaptor body as if there were more than one light source inside the adaptor body. Therefore, less light sources may be needed to illuminate the device. This, in turn, may decrease the cost of the illumination device. When the illumination device is in used, the light of the plurality of light sources shines from the inside cavity of the adaptor body to the outside illuminating the device and in turn, the bicycle wheel. The color of the adaptor body material may match the color of the plurality of lights. Alternatively, or additionally, the plurality of light sources may output a different frequency of light for each wire of the at least one wire.

Figure 9:
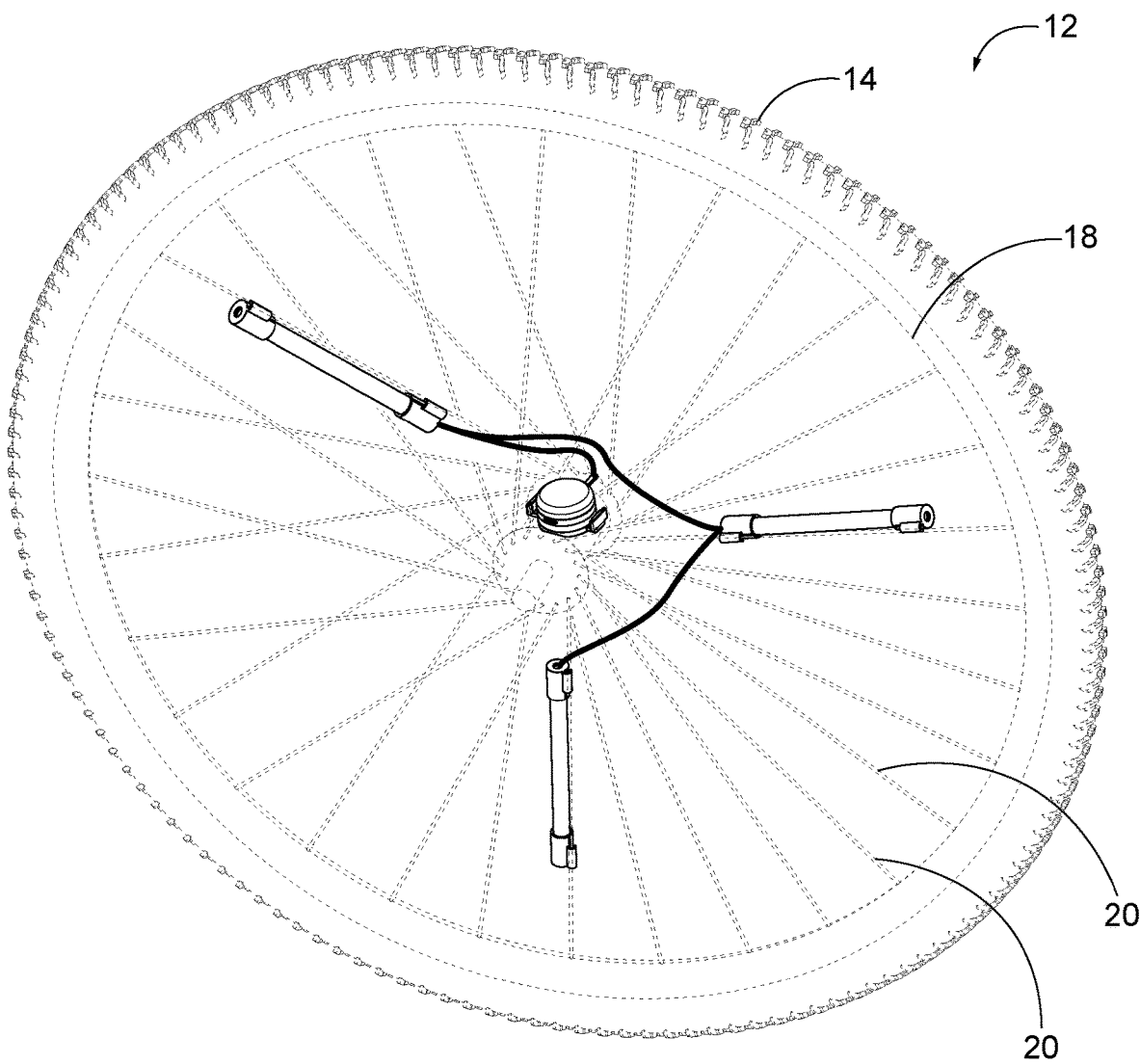
FIG. 9 illustrates an illumination device installed on a bicycle wheel.
Figure 10:
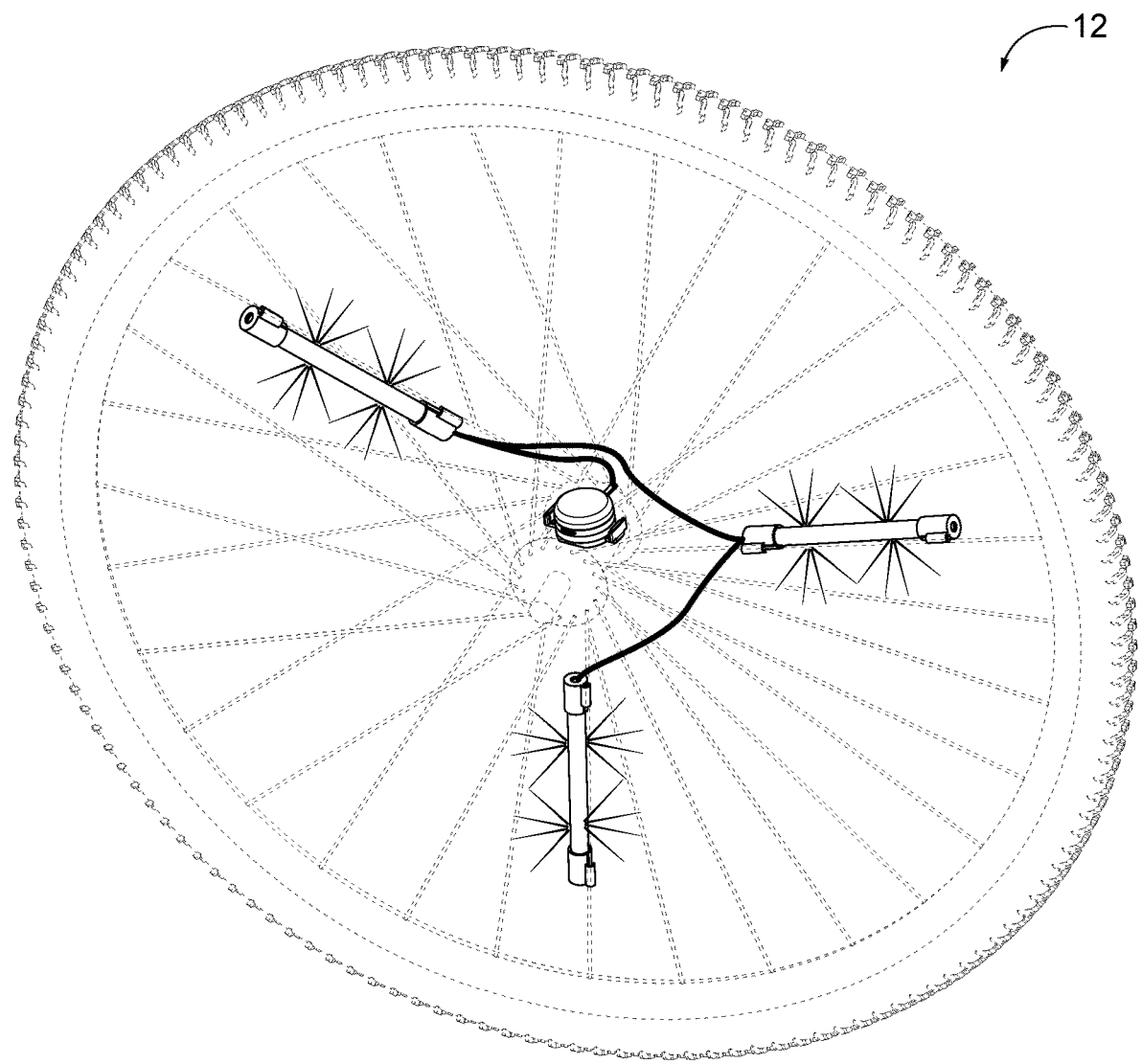
FIG. 10 illustrates an illuminated bicycle wheel.

As illustrated in FIGS. 9-10, the illumination device comprising a power pack, at least one adaptor body, and an at least one attachment portion is placed on a bicycle wheel. The at least one adaptor body is placed on the plurality of spokes of the bicycle wheel by the at least one attachment portion.

The power pack comprises at least one wire, a flexible button cap, a body housing, and circuit board with a switch, the at least one wire comprising a plurality of light sources. The power pack may further comprise a spring, a pair of fasteners, at least one battery, and a O-ring, wherein the spring is adapted to provide contact between the circuit board with a switch and the at least one battery.

The power pack may be located within a pocket portion of a holder. The holder comprises an adjustable strap portion, at least two hook portions, and a pocket portion, wherein the adjustable strap portion is removably attached to at least one hook portion of the at least two hook portions. The adjustable strap may comprise a plurality of openings adapted to adjust the length of the strap for installation, each opening capable of accepting one hook portion of the at least two hook portions.

The power pack may be placed on the hub portion of the bicycle wheel by wrapping around the adjustable strap portion of the holder around the circumference of the hub portion of the bicycle wheel. Alternatively, the power pack may be placed between the plurality of spokes of the bicycle wheel by wrapping around the adjustable strap portion of the holder around at least two spokes of the plurality of spokes of the bicycle wheel.

Once the illumination device is placed on the bicycle wheel, the device may be turn on by depressing the flexible button cap causing electricity to flow to the plurality of light sources resulting in an illuminated bicycle wheel, as shown in FIG. 10.

While this invention has been shown and described with respect to a detailed embodiment or embodiments thereof, it will be understood by those skilled in the art that changes in form and detail thereof may be made without departing from the scope of the claims of the invention.

What is claimed is:

1. An illumination device for a wheel, the illumination device comprising:
    a power pack;
    one or more adaptor bodies, wherein each adaptor body of the one or more adaptor bodies comprises a proximal end, a distal end, and an internal cavity;
    at least two attachment portions coupled to each adaptor body of the one or more adaptor bodies, wherein:
        a first attachment portion is located at the proximal end of the adaptor body,
        a second attachment portion is located at the distal end of the adaptor body, and
        the first attachment portion and the second attachment portion comprise a clip portion comprising a semi-circular shape configured to receive and attach to a spoke of the wheel; and
    at least one light source positioned within the internal cavity through the distal end or the proximal end of each adaptor body of the one or more adaptor bodies, and the at least one light source electrically coupled to the power pack via at least one wire,
    wherein the at least one wire extends throughout the internal cavity of the adaptor body from the proximal end to the distal end of the adaptor body.

2. The illumination device of claim 1, further comprising:
    a holder comprising:
        a pocket portion configured to retain the power pack, and
        at least two hook portions; and
    an adjustable strap attachable to each of the at least two hook portions, wherein the adjustable strap is removably attachable to at least one hook portion of the at least two hook portions.

3. The illumination device of claim 2, wherein the power pack is removably attached to a circumference of a hub portion of the wheel by the adjustable strap.

4. The illumination device of claim 2, wherein the power pack is removably attached to at least two spokes of a plurality of spokes of the wheel by the adjustable strap.

5. The illumination device as claimed in claim 2, wherein the adjustable strap comprises a plurality of openings adapted to adjust a length of the adjustable strap for installation, each opening capable of accepting one hook portion of the at least two hook portions.

6. The illumination device of claim 2, wherein the power pack further comprises an O-ring, the O-ring is located within the pocket portion of the holder.

7. The illumination device of claim 1, wherein the power pack further comprises a spring and at least one battery, wherein the spring is adapted to provide contact between a circuit board with a switch and the at least one battery.

8. The illumination device of claim 1, further comprising at least one tubular body, the at least one tubular body located inside the internal cavity of the one or more adaptor bodies and extending throughout a length of the one or more adaptor bodies from the proximal end to the distal end.

9. The illumination device of claim 8, wherein the at least one tubular body causes light from the at least one light source to diffuse throughout a portion of the length of the internal cavity of the one or more adaptor bodies.

10. The illumination device of claim 1, wherein each of the at least one light source positioned within the internal cavity of each of the one or more adaptor bodies is electrically coupled to the power pack by at least two wires, and the each of the at least two wires causes the at least one light source to output a different frequency of light.

11. The illumination device of claim 1, wherein the one or more adaptor bodies further comprise a semi-opaque material allowing light from the at least one light source to be visible.

12. The illumination device of claim 11, wherein the semi-opaque material color of the adaptor bodies matches a light color from the at least one light source.

13. The illumination device of claim 1, wherein the power pack comprises:
 a flexible button cap;
 a body housing comprising an opening, a top portion, a central portion, and a bottom portion;
 a circuit board comprising a switch; and
 the circuit board is electrically coupled to the at least one wire.

14. The illumination device of claim 13, wherein:
 the central portion is between the top portion and the bottom portion,
 the opening extends through the central portion,
 the at least one wire extends through the opening, such that the at least one wire is offset from the top portion and the bottom portion,
 the top portion of the body housing is attached to the flexible button cap, and
 the bottom portion of the body housing is attached a holder.

15. The illumination device of claim 13, wherein the top portion of the body housing is removably attached to the flexible button cap.

16. The illumination device of claim 13, wherein the bottom portion of the body housing is removably attached to a holder.

17. The illumination device of claim 13, wherein the central portion of the body housing comprises the opening of the body housing.

18. The illumination device of claim 13, the central portion of the body housing further comprises waterproofing material.

19. The illumination device of claim 13, wherein the bottom portion of the body housing comprises at least one bayonet attachment.

20. An illumination device for a wheel, the illumination device comprising:
 a power pack;
 one or more adaptor bodies, wherein each adaptor body of the one or more adaptor bodies comprises a proximal end, a distal end, and an internal cavity;
 at least two attachment portions coupled to each adaptor body of the one or more adaptor bodies, wherein:
  a first attachment portion is located at the proximal end of the adaptor body,
  a second attachment portion is located at the distal end of the adaptor body, and
  the first attachment portion and the second attachment portion comprise a clip portion comprising a semi-circular shape configured to receive and attach to a spoke of the wheel; and
 at least one light source positioned within the internal cavity through the distal end or the proximal end of each adaptor body of the one or more adaptor bodies, and the at least one light source electrically coupled to the power pack via at least one wire,
 wherein the one or more adaptor bodies are configured such that light from the at least one light source is diffused throughout a portion of the length of the internal cavity of the one or more adaptor bodies.

21. The illumination device of claim 20, further comprising:
 a holder comprising:
  a pocket portion configured to retain the power pack, and
  at least two hook portions; and
 an adjustable strap attachable to each of the at least two hook portions, wherein the adjustable strap is removably attachable to at least one hook portion of the at least two hook portions.

22. The illumination device of claim 21, wherein the power pack is removably attached to a circumference of a hub portion of the wheel by the adjustable strap.

23. The illumination device of claim 21, wherein the power pack is removably attached to at least two spokes of a plurality of spokes of the wheel by the adjustable strap.

24. The illumination device of claim 20, further comprising at least one tubular body, the at least one tubular body located inside the internal cavity of the one or more adaptor bodies and extending throughout a length of the one or more adaptor bodies from the proximal end to the distal end.

25. The illumination device of claim 24, wherein the at least one tubular body causes light from the at least one light source to diffuse throughout a portion of the length of the internal cavity of the one or more adaptor bodies.

26. The illumination device of claim 20, wherein each of the at least one light source positioned within the internal cavity of each of the one or more adaptor bodies is electrically coupled to the power pack by at least two wires, and the each of the at least two wires causes the at least one light source to output a different frequency of light.

27. The illumination device of claim 20, wherein the one or more adaptor bodies further comprise a semi-opaque material allowing light from the at least one light source to be visible.

28. The illumination device of claim 27, wherein the semi-opaque material color of the adaptor bodies matches a light color from the at least one light source.

* * * * *